US012651977B2

(12) United States Patent
Bohlin et al.

(10) Patent No.: US 12,651,977 B2
(45) Date of Patent: *Jun. 9, 2026

(54) PULSE WIDTH MODULATION SYSTEM AND A METHOD IN RELATION THERETO

(71) Applicant: ALSTOM Holdings, Saint-Ouen-sur-Seine (FR)

(72) Inventors: Henrik Bohlin, Surahammar (SE); Åke Christensson, Västerås (SE); Lucas Lodesten, Västerås (SE); Torbjörn Trostén, Västerås (SE)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 258 days.

This patent is subject to a terminal disclaimer.

(21) Appl. No.: 18/573,030

(22) PCT Filed: Jun. 15, 2022

(86) PCT No.: PCT/EP2022/066257
§ 371 (c)(1),
(2) Date: Dec. 21, 2023

(87) PCT Pub. No.: WO2022/268593
PCT Pub. Date: Dec. 29, 2022

(65) Prior Publication Data
US 2024/0291401 A1      Aug. 29, 2024

(30) Foreign Application Priority Data
Jun. 22, 2021      (SE) ..................................... 2150797-5

(51) Int. Cl.
*H02M 7/53*          (2006.01)
*G06F 1/14*          (2006.01)
(Continued)

(52) U.S. Cl.
CPC ............ *H02M 7/5395* (2013.01); *G06F 1/14* (2013.01); *G06F 13/4282* (2013.01)

(58) Field of Classification Search
CPC ..... G06F 13/4282; G06F 1/14; H02M 7/5395
See application file for complete search history.

(56) References Cited

U.S. PATENT DOCUMENTS 7,911,967 B2 *  3/2011  Saitou .................... G08C 19/22
                                                          710/110
7,977,817 B2    7/2011  Joos
                        (Continued)

FOREIGN PATENT DOCUMENTS

CN      112810226 A     5/2021
GB      2470591 A      12/2010
                        (Continued)

OTHER PUBLICATIONS

International Search Report and Written Opinion issued for priority International Application No. PCT/EP2022/066257 mailed Oct. 20, 2022.

*Primary Examiner* — Henry Tsai
*Assistant Examiner* — Harry Z Wang
(74) *Attorney, Agent, or Firm* — Renner, Otto, Boisselle & Sklar, LLP

(57)                    ABSTRACT

A pulse width modulation system including a plurality of module building blocks. A master control board includes a master board timer to generate a clock signal having a master timer rate. Each of slave control boards includes a slave board timer and is configured to determine a fictive master board timer based upon timer information received from the master control board via a communication bus, and further to synchronize the timer rate of the slave board timer to the master timer rate. The timer information includes timer offset information defining a time offset between the master board timer and the slave board timer The slave (Continued)

control board applies the time offset in control of pulse width modulated phase outputs such that the position of a slave pulse width modulated phase output signal is controlled in relation to the fictive master board timer.

9 Claims, 4 Drawing Sheets

(51) Int. Cl.
    *G06F 13/42*          (2006.01)
    *H02M 7/5395*     (2006.01)

(56)           References Cited

U.S. PATENT DOCUMENTS

| | | | |
|---|---|---|---|
| 2002/0065940 A1* | 5/2002 | Suzuki | H04L 9/40 |
| | | | 709/248 |
| 2009/0184742 A1 | 7/2009 | Kris | |

| | | | |
|---|---|---|---|
| 2014/0149612 A1* | 5/2014 | Suzuki | G06F 13/24 |
| | | | 710/48 |
| 2016/0183351 A1* | 6/2016 | Snyder | H05B 47/105 |
| | | | 315/246 |
| 2016/0211771 A1* | 7/2016 | Ichihara | H02M 1/08 |
| 2017/0168520 A1 | 6/2017 | Yu | |
| 2019/0013748 A1* | 1/2019 | Barrenscheen | G06F 1/08 |
| 2020/0177092 A1* | 6/2020 | Ledezma | H02P 27/08 |
| 2020/0280279 A1* | 9/2020 | Chalmers | H02P 23/0004 |

FOREIGN PATENT DOCUMENTS

| | | |
|---|---|---|
| JP | 2002164872 A | 6/2002 |
| WO | 2018087187 A1 | 5/2018 |

* cited by examiner c1  c2                                                              MASTER

SLAVE $\Delta\theta$ $$c2 = c1 + \Delta\theta$$

c1  c2                                                              MASTER

FICTIVE
                                                                    MASTER c3  c4          $c2 = c3 + \Delta\theta$

SLAVE $\Delta\theta$ $$c2 = c1 + \Delta\theta = c3 + \text{offset} + \Delta\theta$$

PULSE WIDTH MODULATION SYSTEM AND A METHOD IN RELATION THERETO

This application is a national phase of International Application No. PCT/EP2022/066257 filed Jun. 15, 2022, which claims priority to Swedish Application No. 2150797-5 filed Jun. 22, 2021, each of which is hereby incorporated herein by reference in its entirety.

TECHNICAL FIELD

The present disclosure relates to a pulse width modulation system and a method in a pulse width modulation system, and in particular to a system and method using so called soft synchronization of timing between control modules. The system and method is advantageously applied in rail-bound vehicles.

BACKGROUND

Pulse width modulation (PWM) is a method of reducing the average power delivered by an electrical signal, by effectively chopping it up into discrete parts.

In a pulse width modulation system a number of racks are normally provided, each comprising a number of control boards. Each control board is configured to control a module building block that in turn is provided with a number of function modules. Each function module is configured to power and control a load using pulse width modulation. The load may e.g. be one or several traction motors connected in parallel; an auxiliary transformer; a brake chopper resistor; a step-up chopper, and a main transformer winding, for AC system with line converter. The various loads connected to the different module building blocks must be controlled and energized with respect to each other such that the power outtake is relatively even over time. Therefore is the synchronization of the timing applied by the different control boards used to control the functional modules of a rack very important.

The control boards are connected to each other by a communication bus, e.g. an inter converter serial bus (ICE-bus). Conventionally, so-called hard synchronization is applied which means that the clock rate and timer values of the control boards at the same rack are kept the same.

One disadvantage of applying hard synchronization is that the control boards have to be restarted in a certain order in order to get interrupts running.

More particularly, at the root of the problem is the interrupt handling. For hard synchronized timers, each board needs to change its timer value to get in synchronization with the master board. However, changing the timer value cannot be done independently from the interrupt handling process.

The method to synchronize the board timers and interlace the PWM outputs is relevant to be able to reduce the size of the dc-link capacitor. This is beneficial for both SiC or Si based modules. It could become more important for SiC based inverters as they could be built smaller, due to reduced losses and then the relative size of the capacitor increases.

One purpose of the traction convertor is to convert DC voltage to a variable voltage and a variable frequency, e.g. adapted to the engines. A rapid and accurate control of the engine torque may thereby be achieved such that the train have a smooth movement.

Related background technology is disclosed in US-2009/0184742 that relates to externally synchronizing multiphase pulse width modulation signals.

The object of the present invention is to achieve an improved pulse width modulation system where the above disadvantage is removed.

SUMMARY

The above-mentioned object is achieved by the present invention according to the independent claims.

Preferred embodiments are set forth in the dependent claims.

The present invention relates to soft synchronized control board timers.

The benefit of providing soft synchronized control board timers according to the present invention, is that it allows for restarts of the master control board (clock reference board) without having to change the timer (i.e. change interrupts) of the slave control boards. In a soft synchronized system, as the master boards starts up or is changed, the slave boards resynchronize their clock rate towards the clock rate of the master board and updates the offset to the master board timer. The offset towards the master control board is then used to re-interlace the PWMs running on the slave control boards.

By applying the solution according to the present invention, an interlacing procedure may be performed independently of the interrupt handling, which is advantageous.

In addition, it enables to interlace PWMs running on oversampling interrupts.

Thus, one of the control boards is designated a master control board and the others are slave control boards. The roles of the control boards may change from time to time, and different control boards may take the role of being the master control board.

For each slave control board is determined a fictive master control board timer based upon a timer offset in relation to the master board timer, wherein the timer offset is received from the master control board via a communication bus, e.g. an inter converter serial bus (ICE-bus). By fictive master board timer is meant a re-constructed master timer. The exact value of the master timer is not known, but through the fictive master board timer the value of the master timer is known sufficiently correct.

The clock rates of slave timers of the slave control boards are adapted to the clock rate of the master control board, as it makes it possible to get a relative correct interlacing even though the individual control boards may have different absolute reference timer values. By applying the present invention, it is facilitated to interlace PWM connected to the communication bus without having issues related to control board restarts or to handle change of interrupts. The same method may be applied to interlace PWM used by e.g. a motor controller.

DETAILED DESCRIPTION

The pulse width modulation system, and the method, will now be described in detail with references to the appended figures. Throughout the figures the same, or similar, items have the same reference signs. Moreover, the items and the figures are not necessarily to scale, emphasis instead being placed upon illustrating the principles of the invention.

Figure 3:
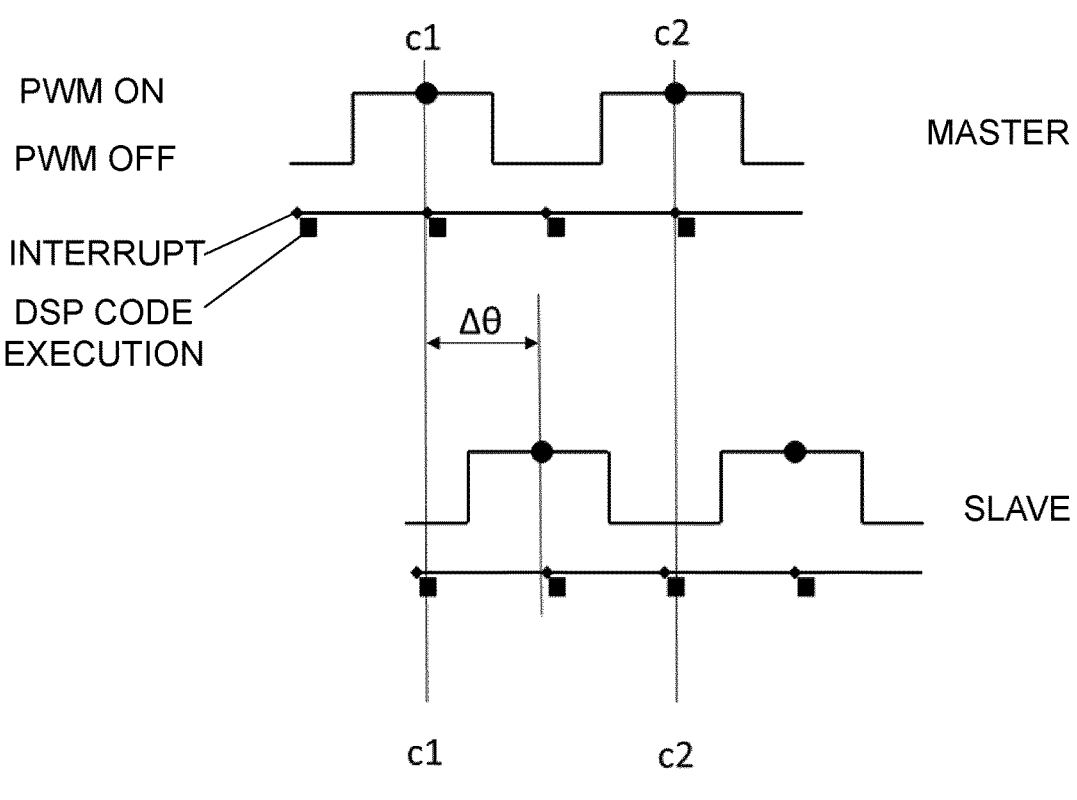
FIG. 3 illustrates a clock pulse applying hard synchronization.

FIGS. 3-6 show various pulse trains where c1-c4 designate points of time for interlacing points (also referred to as synchronization point), and $\theta$ designates an interlacing angle. FIG. 3 illustrates hard synchronized master and slave control board timers.

Regardless of interrupt method, the control boards need a method to synchronize clocks, so that the interlacing points occur correct in physical time. As discussed above, if the control board share the same timer and clock value then the boards are hard synchronized. For hard synchronized boards, the interrupt (interlacing point) can be shifted for the slave board to achieve the desired interlacing angle $\theta$. In FIG. 3 is also shown the on and off of the PWM, the interrupts, and the digital signal processor (DSP) code execution performed after each interrupt.

Figure 4:
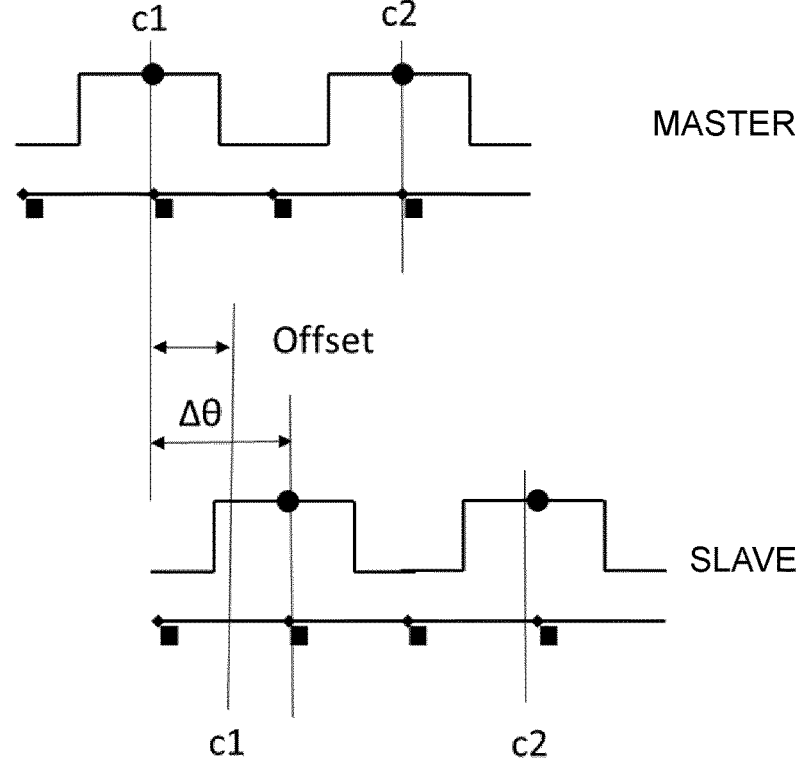
FIG. 4 illustrates a clock pulse applying soft synchronization.

FIG. 4 illustrates soft synchronized master and slave control board timers having different timers but have same clock frequency.

In case the boards are soft synchronized, the clocks are controlled such that there exist a near constant offset between the control board timers.

Figure 5:
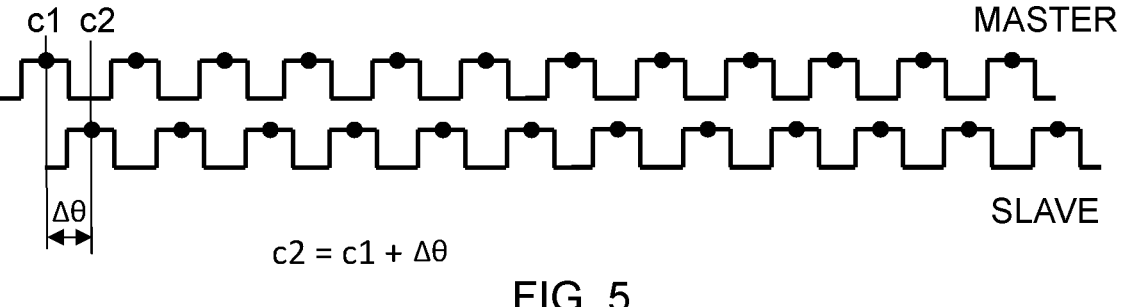
FIG. 5 illustrates clock pulses applying hard synchronization.

In FIG. 5 is illustrated a pulse train in a pulse width modulation system, where an interlacing point is illustrated for a master board timer and a slave board timer. The interlacing angle, denoted $\theta$, is also indicated. The interlacing angle $\theta$ is applied to define the timing between different connected loads.

The interlacing point is normally symmetrically located on the pulse, i.e. having essentially equal time length to the leading and lagging edge of the pulse. However, the position of the interlacing point may be freely chosen within the PWM period, positive or negative zero vector is preferable. The zero vector point is relatively shifted in time to achieve a certain harmonic spectrum.

One alternative is to run the interrupts in the middle of the pulse period and in this case the zero vector/interlacing point can coincide with the interrupt. The interlacing angles can then be controlled by controlling the interrupt points.

Another alternative is to use an oversampling task and let the interrupts run faster than the pulse period. In this case the zero vector/interlacing point needs to be controlled by the PWM control boards.

As stated above, regardless of interrupt method, the control boards need a method to synchronize clocks, so that the interlacing points occur correct in physical time.

Hard synchronized pulse trains for a master and slave timer are illustrated in FIG. 5. For hard synchronized boards the interrupt and thereby the interlacing point can be shifted for the slave board to achieve the desired interlacing angle, denoted $\theta$.

Figure 6:
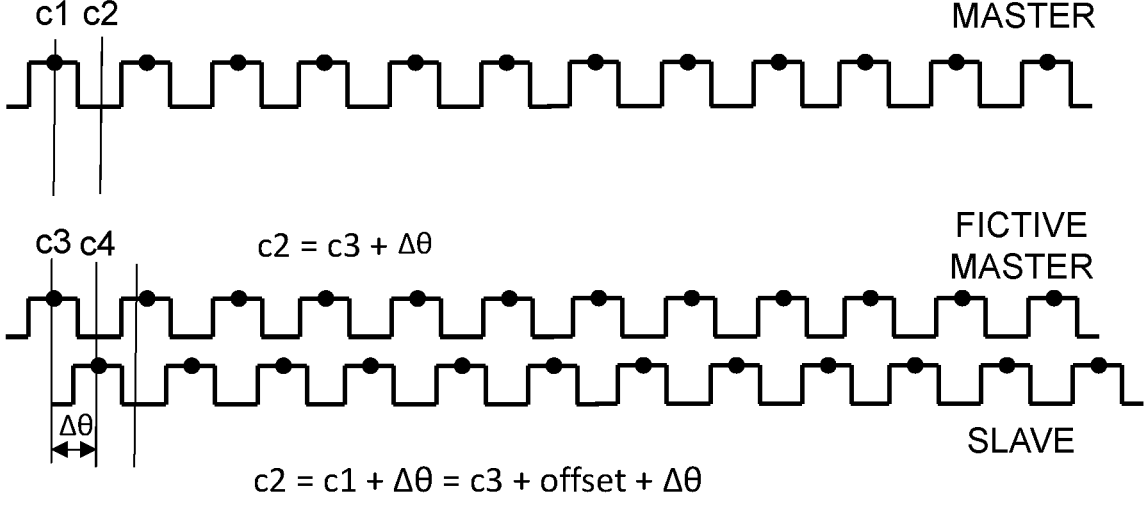
FIG. 6 illustrates clock pulses applying soft synchronization.

If the control boards have different timers, i.e. each control board has its own timer, but have the same clock frequency, the boards are considered to be soft synchronized. This is illustrated in FIG. 6. As mentioned above, the present invention relates to soft synchronized control board timers. Relationships between the timing of interlacing points c1-c4, the offset, and the interlacing angle $\theta$ are shown in FIG. 6.

Figure 1:
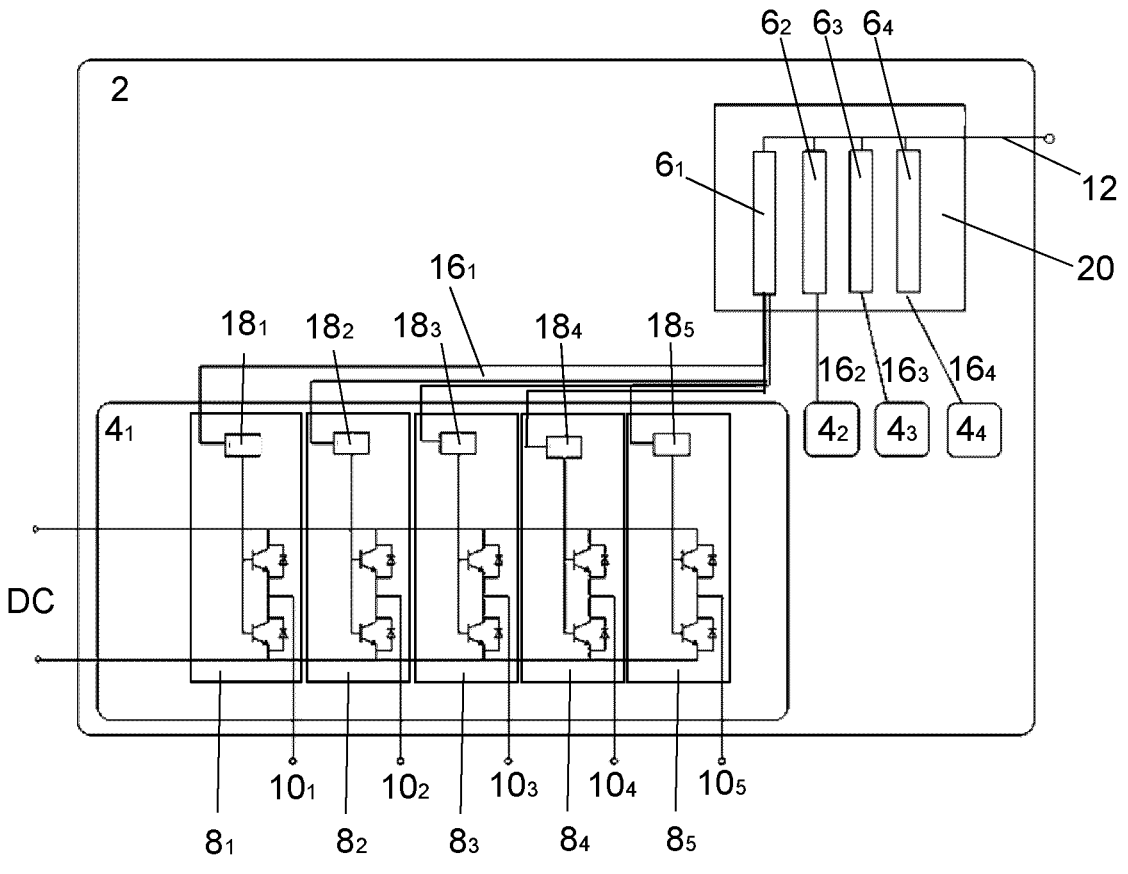
FIG. 1 is a block diagram schematically illustrating the pulse width modulation system according to the present invention.
Figure 2:
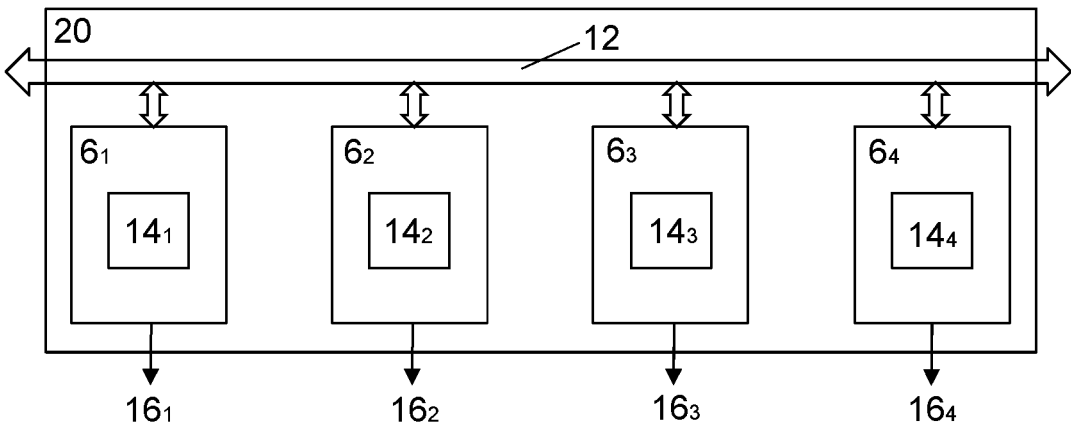
FIG. 2 is a block diagram schematically illustrating a rack including control boards according to the present invention.

Now with references to the block diagrams of FIGS. 1 and 2, a pulse width modulation system 2 comprising a plurality of module building blocks $4_1$-$4_4$ is provided. The number of module building blocks is in the disclosed example four, but may naturally be higher or lower.

Each building block $4_1$-$4_4$ is connected to, and controlled by a control board $6_1$-$6_4$, and each module building block comprises a set of function modules $8_1$-$8_5$, provided with pulse width modulated phase outputs $10_1$-$10_5$ adapted to be connected to predetermined loads. The control boards $6_1$-$6_4$ are preferably located in a rack 20.

A single control board thus controls a configurable number of function modules in one module building block, depending on the application.

The loads connected to the function modules may be one or many of the following: one or several traction motors, e.g. connected in parallel; an auxiliary transformer; a brake chopper resistor; a step-up chopper, and a main transformer winding, for AC system with line converter.

Furthermore, each module building block $4_1$-$4_4$ is connected to a direct current (DC) link, and that the control boards $6_1$-$6_4$ are connected to each other via a communication bus 12, preferably an inter converter serial bus (ICE-bus).

In an exemplary setup, the pulse width modulation system 2 comprises four module building blocks-three for a motor converter and one for a brake chopper. The latter has the task of taking care of the energy from braking motors in cases where the energy cannot be supplied back to the line voltage.

The control boards uses a pulse width modulation method to control the pulse width modulated phase outputs $10_1$-$10_5$, i.e. the output of each of the function modules in a module building block. Depending on the application and type of PWM method, it is desirable to control the phase of the harmonics in relation to the other control boards connected to the same communication bus.

One of the control boards is a master control board $6_1$ and the others are slave control boards $6_2$, $6_3$, $6_4$.

The master control board $6_1$ comprises a master board timer $14_1$ (see FIG. 2) configured to generate a clock signal having a master timer rate, wherein each of the slave control boards $6_2$, $6_3$, $6_4$ comprises a slave board timer $14_2$, $14_3$, $14_4$.

Each slave control board $6_2$, $6_3$, $6_4$ is configured to determine a fictive master board timer based upon timer information received from the master control board $6_1$ via the communication bus 12, and is further configured to synchronize the timer rate of the slave board timer $14_2$, $14_3$, $14_4$ to the master timer rate.

In addition, the timer information also comprises timer offset information defining a time offset between the master board timer $14_1$ and each of the slave board timers $14_2$, $14_3$, $14_4$. Each of the slave control board $6_2$, $6_3$, $6_4$ is then configured to apply the received time offset in the control of the pulse width modulated phase outputs $10_1$-$10_5$, such that the position of a slave pulse width modulated phase output signal of the function module is controlled in relation to the fictive master board timer.

According to one embodiment, the slave board timers $14_2$, $14_3$, $14_4$ are configured to continue running independently if the master board timer $14_1$ is running or not, using the lastly received master timer rate and timer offset, and to resynchronize to the master timer rate, and to update the timer offset, when the master board timer $14_1$ restarts, or changes.

In a further embodiment, each control board $6_1$-$6_4$ is configured to control the set of function modules $8_1$-$8_5$ being e.g. IGBT or MOSFET modules, in the module building block $4_1$-$4_4$ using an optical protocol communication line $16_1$-$16_5$ and applying a gate drive unit $18_1$-$18_5$ for each module in the module building block $4_1$-$4_4$.

In one exemplary function module it comprises two SiC-MOSFETs and two SiC-Schottky diodes that handle 1700 V and 2×900 A. They work in pairs, an upper and a lower, which together form a phase leg. When one leads, the other is off and vice versa. This is how you may control e.g. the power to the motors. The switching frequency may be several kHz.

The present invention also relates to method in a pulse width modulation system 2, which has been described in detail above, and it is herein referred to that description.

Thus, the pulse width modulation system comprises a plurality of module building blocks $4_1$-$4_4$, where each building block is connected to and controlled by a control board $6_1$-$6_4$. Each module building block comprises a set of function modules $8_1$-$8_5$, provided with pulse width modulated phase outputs $10_1$-$10_5$ adapted to be connected to predetermined loads, and that each module building block $4_1$-$4_4$ is connected to a direct current (DC) link. The control boards $6_1$-$6_4$ are connected to each other via a communication bus 12, preferably an inter converter serial bus (ICE-bus).

One of the control boards is a master control board $6_1$ and the others are slave control boards $6_2$, $6_3$, $6_4$. The master control board $6_1$ comprises a master board timer $14_1$ configured to generate a clock signal having a master timer rate, wherein each of the slave control boards $6_2$, $6_3$, $6_4$ comprises a slave board timer $14_2$, $14_3$, $14_4$.

Figure 7:
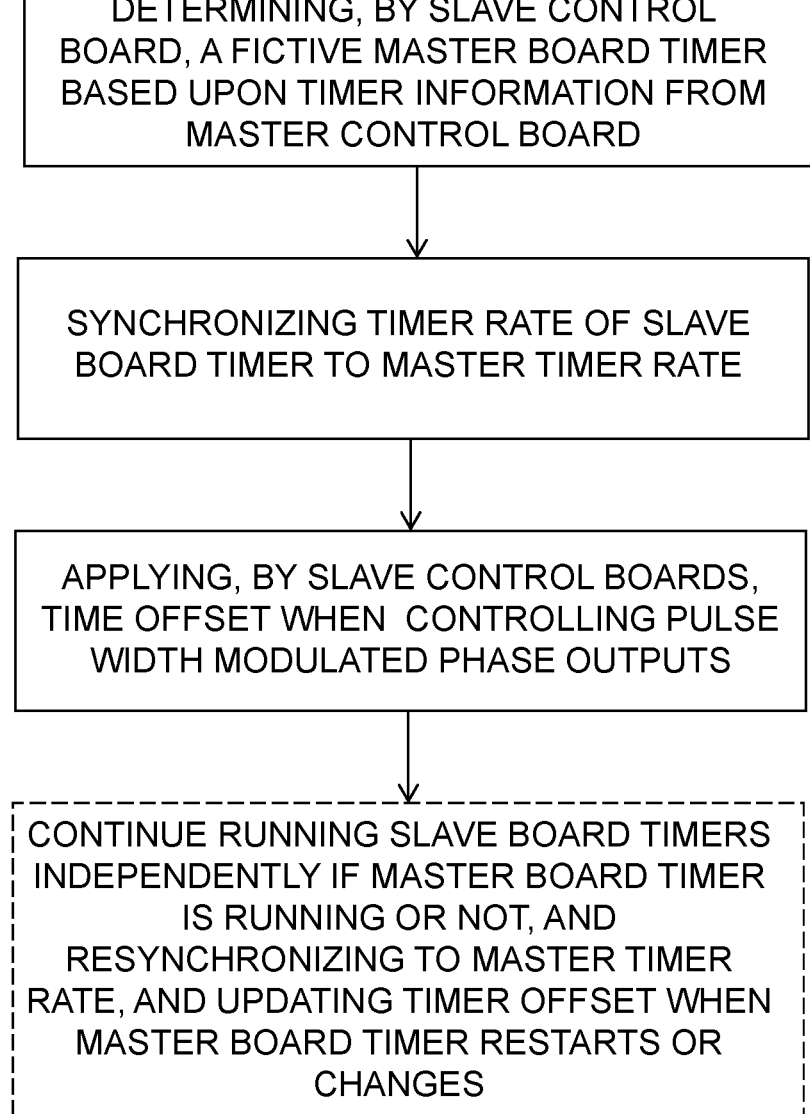
FIG. 7 is a flow diagram of the method according to the present invention.

With references to the flow diagram shown in FIG. 7, the method comprises:

determining, by each slave control board $6_2$, $6_3$, $6_4$, a fictive master board timer based upon timer information received from said master control board $6_1$ via the communication bus 12, synchronizing the timer rate of the slave board timer $14_2$, $14_3$, $14_4$ to the master timer rate.

The timer information also comprises timer offset information defining a time offset between the master board timer $14_1$ and the slave board timer $14_2$, $14_3$, $14_4$. The method further comprises:

applying, by each slave control boards $6_2$, $6_3$, $6_4$ the time offset when controlling the pulse width modulated phase outputs $10_1$-$10_5$, such that the position of a slave pulse width modulated phase output signal is controlled in relation to the fictive master board timer.

According to a further embodiment, illustrated by a dashed box in the flow diagram of FIG. 5, the method also comprises continue running the slave board timers $14_2$, $14_3$, $14_4$ independently if the master board timer $14_1$ is running or not, using the lastly received master timer rate and timer offset, and resynchronizing to the master timer rate, and updating the timer offset, when the master board timer $14_1$ restarts, or changes.

The present invention also relates to a rail-bound vehicle comprising one or many pulse width modulation systems as described above.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A pulse width modulation system comprising a plurality of module building blocks, where each building block is connected to and controlled by a control board, each module building block comprises a set of function modules, provided with pulse width modulated phase outputs adapted to be connected to predetermined loads, and wherein each module building block is connected to a direct current (DC) link, and that the control boards are connected to each other via a communication bus, one of the control boards is a master control board and the others are slave control boards, the master control board comprises a master board timer configured to generate a clock signal having a master timer rate, wherein each of the slave control boards comprises a slave board timer, wherein each slave control board is configured to determine a fictive master board timer based upon timer information received from said master control board via said communication bus, and is further configured to synchronize the timer rate of the slave board timer to the master timer rate, wherein said timer information also comprises timer offset information defining a time offset between the master board timer and the slave board timer, and wherein the slave control board is configured to apply said time offset in the control of the pulse width modulated phase outputs, such that the position of a slave pulse width modulated phase output signal is controlled in relation to the fictive master board timer.

2. The system according to claim 1, wherein said slave board timers are configured to continue running independently if the master board timer is running or not, using the lastly received master timer rate and timer offset, and to resynchronize to the master timer rate, and to update the timer offset, when the master board timer restarts, or changes.

3. The system according to claim 1, wherein said communication bus is an inter converter serial bus (ICE-bus).

4. The system according to claim 1, wherein said loads comprise one or many of the following:

one or several traction motors connected in parallel;

an auxiliary transformer;

a brake chopper resistor;

a step-up chopper, and a main transformer winding, for AC system with line converter.

5. The system according to claim 1, wherein each control board is configured to control said set of function modules being IGBT or MOSFET modules, in the module building block using an optical protocol communication line and applying a gate drive unit for each module in the module building block.

6. The system according to claim 1, wherein said control boards are located in a rack.

7. A method in a pulse width modulation system comprising a plurality of module building blocks, where each building block is connected to and controlled by a control board, each module building block comprises a set of function modules, provided with pulse width modulated phase outputs adapted to be connected to predetermined loads, and wherein each module building block is connected to a direct current (DC) link, and that the control boards are connected to each other via a communication bus, one of the control boards is a master control board and the others are slave control boards, the master control board comprises a master board timer configured to generate a clock signal having a master timer rate, wherein each of the slave control boards comprises a slave board timer, wherein the method comprises:

determining, by each slave control board, a fictive master board timer based upon timer information received from said master control board via said communication bus, synchronizing the timer rate of the slave board timer to the master timer rate, wherein said timer information also comprises timer offset information defining a time offset between the master board timer and the slave board timer, the method further comprises:

applying, by each slave control boards, said time offset when controlling the pulse width modulated phase outputs, such that the position of a slave pulse width modulated phase output signal is controlled in relation to the fictive master board timer.

8. The method according to claim 7, comprising continue running said slave board timers independently if the master board timer is running or not, using the lastly received master timer rate and timer offset, and resynchronizing to the master timer rate, and updating the timer offset, when the master board timer restarts, or changes.

9. A rail-bound vehicle comprising one or many pulse width modulation systems according to claim 1.

\* \* \* \* \*